(12) United States Patent
Konduru et al.

(10) Patent No.: US 10,459,633 B1
(45) Date of Patent: Oct. 29, 2019

(54) METHOD FOR EFFICIENT LOAD BALANCING IN VIRTUAL STORAGE SYSTEMS

(71) Applicant: EMC IP Holding Company LLC, Hopkinton, MA (US)

(72) Inventors: Jayasekhar Konduru, Sunnyvale, CA (US); Shuang Liang, Los Altos, CA (US); Yiqiang Ding, San Jose, CA (US); Shyam Burkule, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 83 days.

(21) Appl. No.: 15/656,327

(22) Filed: Jul. 21, 2017

(51) Int. Cl.
 *G06F 3/06* (2006.01)

(52) U.S. Cl.
 CPC .......... *G06F 3/0608* (2013.01); *G06F 3/0619* (2013.01); *G06F 3/0631* (2013.01); *G06F 3/0665* (2013.01); *G06F 3/0689* (2013.01)

(58) Field of Classification Search
 CPC .... G06F 3/0608; G06F 3/0631; G06F 3/0665; G06F 3/0689; G06F 3/0619
 See application file for complete search history.

(56) References Cited

U.S. PATENT DOCUMENTS

| | | |
|---|---|---|
| 7,085,911 B2 | 8/2006 | Sachedina et al. |
| 7,818,515 B1 * | 10/2010 | Umbehocker ........ G06F 3/0605 711/114 |
| 8,190,835 B1 | 5/2012 | Yueh |
| 8,396,841 B1 | 3/2013 | Janakiraman |
| 8,732,403 B1 | 5/2014 | Nayak |
| 8,782,323 B2 | 7/2014 | Glikson et al. |
| 8,898,114 B1 | 11/2014 | Feathergill et al. |
| 8,898,120 B1 | 11/2014 | Efstathopoulos |
| 8,904,120 B1 | 12/2014 | Killammsetti et al. |
| 8,918,390 B1 | 12/2014 | Shilane et al. |
| 8,943,032 B1 | 1/2015 | Xu et al. |
| 8,949,208 B1 | 2/2015 | Xu et al. |
| 9,183,200 B1 | 11/2015 | Liu et al. |
| 9,244,623 B1 | 1/2016 | Bent et al. |
| 9,250,823 B1 | 2/2016 | Kamat et al. |
| 9,251,160 B1 | 2/2016 | Wartnick |

(Continued)

FOREIGN PATENT DOCUMENTS

| | | |
|---|---|---|
| EP | 2738665 A1 | 6/2014 |
| WO | 2013056220 A1 | 4/2013 |

(Continued)

OTHER PUBLICATIONS

Deepavali Bhagwat et al.; "Extreme Binning: Scalable, Parallel Deduplication for Chunk-based File Backup"; IEEE MASCOTS; Sep. 2009 (10 pages).

(Continued)

*Primary Examiner* — Tasnima Matin
(74) *Attorney, Agent, or Firm* — Chamberlain, Hrdlicka, White, Williams & Aughtry

(57) ABSTRACT

A data storage device includes virtual storage devices, hosted by physical storage devices, and a processor. The processor obtains a data storage request, divides a file specified by the data storage request into blocks, and stores the blocks in the virtual storage devices based on an input output (IO) limitation of the virtual storage devices.

14 Claims, 12 Drawing Sheets

(56) References Cited

U.S. PATENT DOCUMENTS

| | | | |
|---|---|---|---|
| 9,280,550 | B1 | 3/2016 | Hsu et al. |
| 9,298,724 | B1 | 3/2016 | Patil et al. |
| 9,317,218 | B1 | 4/2016 | Botelho et al. |
| 9,336,143 | B1 | 5/2016 | Wallace et al. |
| 9,390,116 | B1 | 7/2016 | Li et al. |
| 9,390,281 | B2 | 7/2016 | Whaley et al. |
| 9,442,671 | B1* | 9/2016 | Zhang .................. G06F 3/0635 |
| 9,830,111 | B1 | 11/2017 | Patiejunas et al. |
| 10,002,048 | B2 | 6/2018 | Chennamsetty et al. |
| 10,031,672 | B2 | 7/2018 | Wang et al. |
| 10,102,150 | B1 | 10/2018 | Visvanathan et al. |
| 10,175,894 | B1 | 1/2019 | Visvanathan et al. |
| 2003/0110263 | A1* | 6/2003 | Shillo .................. G06F 3/0601 709/226 |
| 2005/0120058 | A1* | 6/2005 | Nishio .................. G06F 16/185 |
| 2005/0160225 | A1 | 7/2005 | Presler-Marshall |
| 2005/0182906 | A1 | 8/2005 | Chatterjee et al. |
| 2006/0075191 | A1* | 4/2006 | Lolayekar ............. G06F 3/0613 711/114 |
| 2008/0082727 | A1 | 4/2008 | Wang |
| 2008/0133446 | A1 | 6/2008 | Dubnicki et al. |
| 2008/0133561 | A1 | 6/2008 | Dubnicki et al. |
| 2008/0216086 | A1* | 9/2008 | Tanaka ................. G06F 3/061 718/105 |
| 2008/0244204 | A1 | 10/2008 | Cremelie et al. |
| 2009/0235115 | A1 | 9/2009 | Butlin |
| 2009/0271454 | A1 | 10/2009 | Anglin et al. |
| 2010/0049735 | A1 | 2/2010 | Hsu |
| 2010/0094817 | A1 | 4/2010 | Ben-Shaul et al. |
| 2010/0250858 | A1 | 9/2010 | Cremelie et al. |
| 2011/0055471 | A1 | 3/2011 | Thatcher et al. |
| 2011/0099351 | A1 | 4/2011 | Condict |
| 2011/0161557 | A1 | 6/2011 | Haines et al. |
| 2011/0185149 | A1 | 7/2011 | Gruhl et al. |
| 2011/0196869 | A1 | 8/2011 | Patterson et al. |
| 2011/0231594 | A1 | 9/2011 | Sugimoto et al. |
| 2012/0158670 | A1 | 6/2012 | Sharma et al. |
| 2012/0278511 | A1* | 11/2012 | Alatorre ................ G06F 3/0605 710/33 |
| 2013/0060739 | A1 | 3/2013 | Kalch et al. |
| 2013/0111262 | A1 | 5/2013 | Taylor et al. |
| 2013/0138620 | A1 | 5/2013 | Yakushev et al. |
| 2014/0012822 | A1 | 1/2014 | Sachedina et al. |
| 2014/0258248 | A1 | 9/2014 | Lambright et al. |
| 2014/0258824 | A1 | 9/2014 | Khosla et al. |
| 2014/0281215 | A1* | 9/2014 | Chen ..................... G06F 3/0604 711/112 |
| 2014/0310476 | A1 | 10/2014 | Kruus |
| 2015/0106345 | A1 | 4/2015 | Trimble et al. |
| 2015/0331622 | A1 | 11/2015 | Chiu et al. |
| 2016/0026652 | A1 | 1/2016 | Zheng |
| 2016/0112475 | A1 | 4/2016 | Lawson et al. |
| 2016/0188589 | A1 | 6/2016 | Guilford et al. |
| 2016/0224274 | A1 | 8/2016 | Kato |
| 2016/0239222 | A1 | 8/2016 | Shetty et al. |
| 2016/0323367 | A1 | 11/2016 | Murtha et al. |
| 2016/0342338 | A1 | 11/2016 | Wang |
| 2017/0093961 | A1 | 3/2017 | Pacella et al. |
| 2017/0220281 | A1 | 8/2017 | Gupta et al. |
| 2017/0300424 | A1 | 10/2017 | Beaverson et al. |
| 2017/0359411 | A1 | 12/2017 | Burns et al. |
| 2018/0089037 | A1 | 3/2018 | Liu et al. |
| 2018/0146068 | A1 | 5/2018 | Johnston et al. |
| 2018/0322062 | A1 | 11/2018 | Watkins et al. |

FOREIGN PATENT DOCUMENTS

| | | |
|---|---|---|
| WO | 2013115822 A1 | 8/2013 |
| WO | 2014185918 A1 | 11/2014 |

OTHER PUBLICATIONS

Mark Lillibridge et al.; "Sparse Indexing: Large Scale, Inline Deduplication Using Sampling and Locality"; 7th USENIX Conference on File and Storage Technologies, USENIX Association; pp. 111-pp. 123; 2009 (13 pages).

Extended European Search Report issued in corresponding European Application No. 18185076.9, dated Dec. 7, 2018 (9 pages).

Lei Xu et al.; "SHHC: A Scalable Hybrid Hash Cluster for Cloud Backup Services in Data Center"; 2011 31st International Conference on Distributed Computing Systems Workshops (ICDCSW); IEEE Computer Society; pp. 31-65; 2011 (5 pages).

International Search Report and Written Opinion issued in corresponding PCT Application PCT/US2018/027646, dated Jul. 27, 2018. (30 pages).

Extended European Search Report issued in corresponding European Application No. 18184842.5, dated Sep. 19, 2018.

Jaehong Min et al.; "Efficient Deduplication Techniques for Modern Backup Operation"; IEEE Transactions on Computers; vol. 60, No. 6; pp. 824-840; Jun. 2011.

Daehee Kim et al.; "Existing Deduplication Techniques"; Data Depublication for Data Optimization for Storage and Network Systems; Springer International Publishing; DOI: 10.1007/978-3-319-42280-0_2; pp. 23-76; Sep. 2016.

International Search Report and Written Opinion issued in corresponding WO application No. PCT/US2018/027642, dated Jun. 7, 2018 (15 pages).

* cited by examiner

| Block ID | 1 | 2 | 3 | 4 | 5 | 6 | 7 | 8 |
|---|---|---|---|---|---|---|---|---|
| Local Physical Storage Device ID | A | B | A | B | A | B | A | B |

FIG. 7D

| Block ID | 1 | 2 | 3 | 4 | 5 | 6 | 7 | 8 |
|---|---|---|---|---|---|---|---|---|
| Local Physical Storage Device ID | A | B | C | A | B | C | A | B |

METHOD FOR EFFICIENT LOAD BALANCING IN VIRTUAL STORAGE SYSTEMS

BACKGROUND

Computing devices generate, use, and store data. The data may be, for example, images, document, webpages, or meta-data associated with any of the files. The data may be stored locally on a persistent storage of a computing device and/or may be stored remotely on a persistent storage of another computing device.

SUMMARY

In one aspect, a data storage device in accordance with one or more embodiments of the invention includes virtual storage devices, hosted by physical storage devices, and a processor. The processor obtains a data storage request, divides a file specified by the data storage request into blocks, and stores the blocks in the virtual storage devices based on an input output (IO) limitation of the virtual storage devices.

In one aspect, a method of operating a data storage device in accordance with one or more embodiments of the invention includes obtaining, by the data storage device, a data storage request. The method includes dividing, by the data storage device, a file specified by the data storage request into blocks. The method includes storing, by the data storage device, the blocks in virtual storage devices of the data storage device based on an input output (IO) limitation of the virtual storage devices.

In one aspect, a non-transitory computer readable medium in accordance with one or more embodiments of the invention includes computer readable program code, which when executed by a computer processor enables the computer processor to perform a method for operating a data storage device, the method obtaining, by the data storage device, a data storage request. The method includes dividing, by the data storage device, a file specified by the data storage request into blocks. The method includes storing, by the data storage device, the blocks in virtual storage devices of the data storage device based on an input output (IO) limitation of the virtual storage devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 7D shows a diagram of an example of storing data in the first example system.

DETAILED DESCRIPTION

Figure 1A:
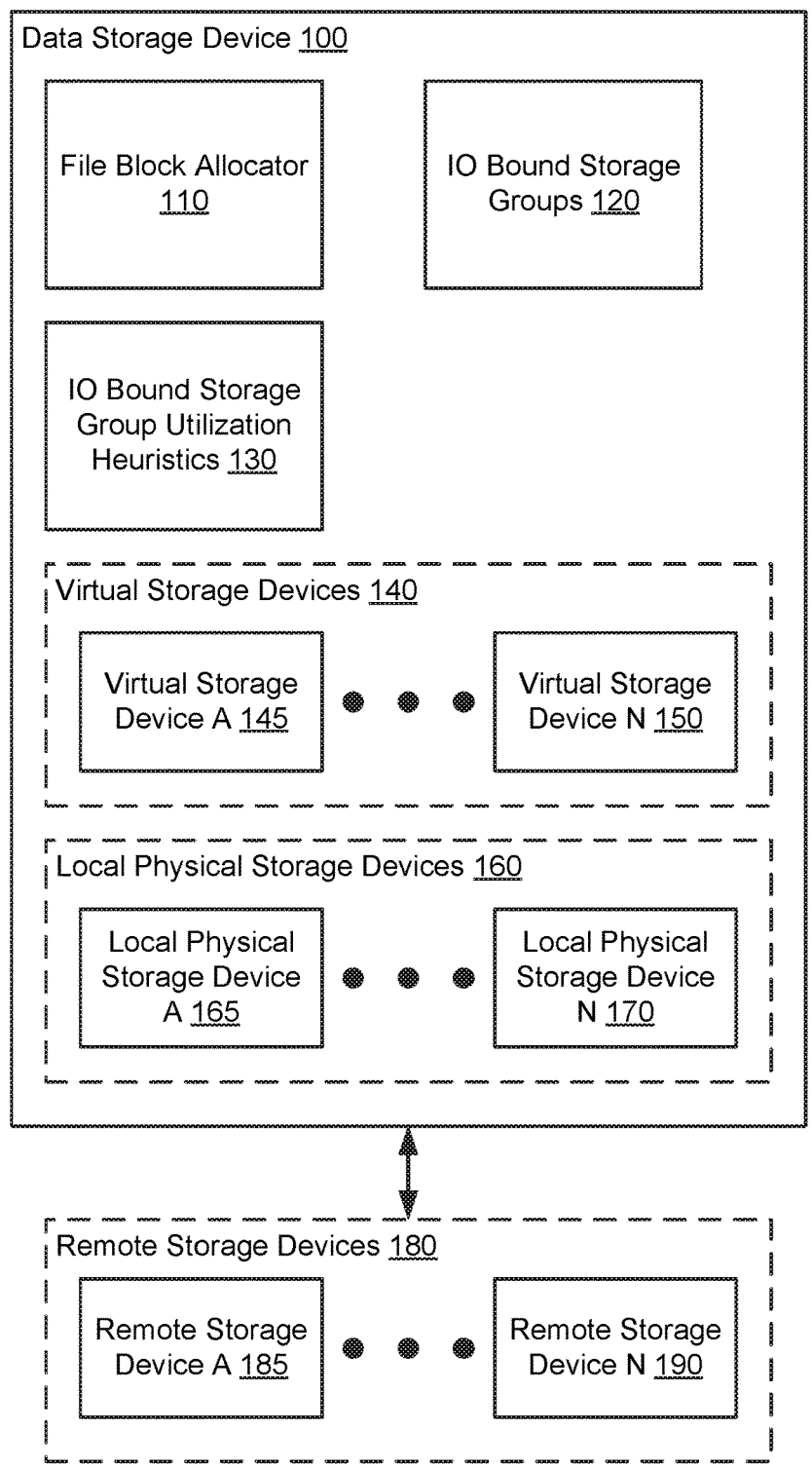
FIG. 1A shows a diagram of a data storage device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to devices, methods, and systems for load balancing data storage. In one or more embodiments of the invention, a data storage device may include a number of virtual storage devices. Each of the virtual storage devices may utilize physical storage devices that have limited input-output (IO) capacity. Some of the virtual storage devices may utilize the same physical storage device, e.g., share the physical storage device.

As used herein, a virtual storage device hosted by a physical storage device means that the virtual storage device utilizes at least a portion of the data storage capacity of the physical storage device. A virtual storage device may be hosted by a single physical storage device or may be hosted by multiple physical storage devices.

In one or more embodiments of the invention, the data storage device may group virtual storage devices based on shared physical storage devices. For example, two virtual storage devices that share a physical storage device may be grouped together into an IO bound storage group.

In one or more embodiments of the invention, the data storage device may distribute storage based on the groupings of virtual storage devices. For example, when a data storage request is received, the data storage device may divide a to-be-stored file into a number of blocks and distribute each of the blocks to different groupings of virtual storage devices. By distributing the blocks to different groups, rather than different virtual storage devices, each block will be stored using different physical storage devices and thereby load balance data storage across the physical storage devices of the data storage system.

FIG. 1 shows a data storage device (100) in accordance with one or more embodiments of the invention. The data storage device (100) device may be programmed to store data. In one or more embodiments of the invention, the data storage device (100) may be operably connected to one or more computing devices (not shown). The computing devices may send data to the data storage device (100) for storage and may request to obtain data stored in the data storage device (100). The data storage device (100) may store or provide data in response to these requests.

The data storage device (100) may be a computing device. The computing device may be a physical device. The computing devices may be, for example, a mobile phone, a tablet computer, a laptop computer, a desktop computer, or a server. The computing device may include one or more processors, memory (e.g., random access memory), and persistent storage (e.g., disk drives, solid state drives, etc.). The persistent storage may store computer instructions, e.g., computer code, that when executed by the processor(s) of the computing device to perform the functions described in this application and illustrated in at least FIGS. 2-6. The data storage device (100) may be other types of computing devices without departing from the invention.

The data storage device (100) may be a cloud resource. The cloud resource may be a logical computing device that utilizes the physical resources of multiple computing devices. Each of the utilized computing devices may include one or more processors, memory (e.g., random access memory), and persistent storage (e.g., disk drives, solid state drives, etc.). The persistent storage may store computer instructions, e.g., computer code, that when executed by the processor(s) of the computing device to perform the functions described in this application and illustrated in at least FIGS. 2-6.

The data storage device may include a file block allocator (110), IO bound storage groups (120), IO bound storage group utilization heuristics (130), virtual storage devices (140), and local physical storage devices (160). Additionally, the data storage device may be operably connected to remote storage devices (180). Each component of the data storage device (100) is described below.

The data storage device (100) may include a file block allocator (110). The file block allocator (110) may divide data, e.g., files, into multiple blocks and distribute the blocks to storage devices of the data storage device (100) for storage. Distributing the blocks may load balance data storage. Load balancing the data storage may improve the operation of the data storage device by increasing the rate of data storage when compared to other data storage devices that do not load balance data storage.

In one or more embodiments of the invention, the file block allocator may be a physical device. The physical device may include circuitry. The physical device may be, for example, a field programmable gate array, an application specific integrated circuit, a digital signal processor, or any other type of physical computing device. The physical device may be configured to perform the functions described in this application and, more specifically, the methods illustrated in at least FIGS. 2-6.

In one or more embodiments of the invention, the file block allocator may be implemented as computer instructions, e.g., computer code, stored on a non-transitory computer readable storage medium operably connected to a processor. The computer instructions, when executed by the processor, may cause the processor to perform the functions described in this application and, more specifically, the methods illustrated in at least FIGS. 2-6. The processor may be a physical device including circuitry. The physical device may be, for example, a central processing unit, microprocessor, coprocessor, core of a multi-core processor, front-end processor, or any other type of programmable digital processor.

The data storage device (100) may include IO bound storage groups (120). The IO bound storage groups (120) may be a data structure that specifies groupings of virtual storage devices (140) that are IO bound. In other words, the groupings may specify virtual storage devices (140) that limit the storage performance rate of other virtual storage devices of the group.

For example, two virtual storage devices that utilize the same physical storage device are only be capable of sharing the data storage rate of the share physical storage device. When the two virtual storage devices store data at different times, each virtual storage device may utilize the full data storage rate of the shared physical storage device. However, when both of the two virtual storage devices store data at the same time, each virtual storage device is only allocated a portion of the full data storage rate of the shared physical storage device. Thus, the data storage rate of either virtual storage device depends on whether the other data storage device is utilizing the shared physical storage device at the same time.

In one or more embodiments of the invention, the IO bound storage groups (120) are stored in the data storage device (100). The IO bound storage groups (120) may be stored in a persistent storage of the data storage device (100). The IO bound storage groups (120) may be stored in a memory of the data storage device (100).

While illustrated as being stored in the data storage device (100) in FIG. 1, the IO bound storage groups (120) may be stored on another computing device operably connected to the data storage device (100) without departing from the invention. The IO bound storage groups (120) may be stored in a persistent storage of the other computing device. The IO bound storage groups (120) may be stored in a memory of the other computing device. The data storage device (100) may access the other computing device to access the IO bound storage groups (120).

Figure 1B:
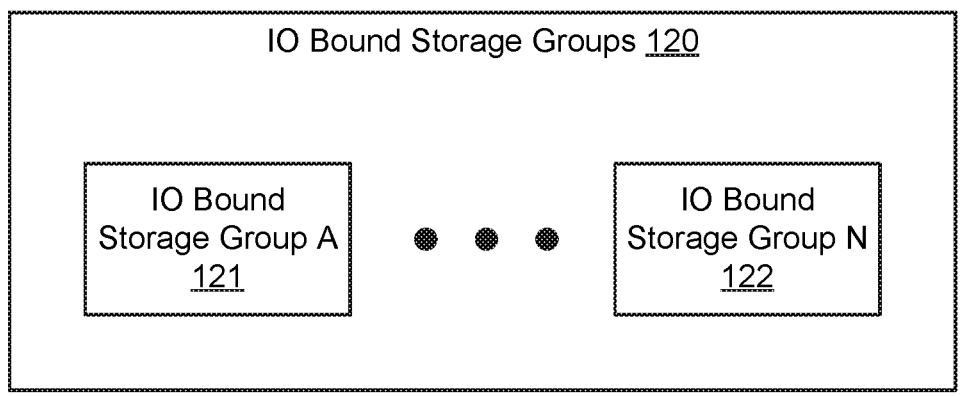
FIG. 1B shows a diagram of input-output (IO) bound storage groups in accordance with one or more embodiments of the invention.
Figure 1C:
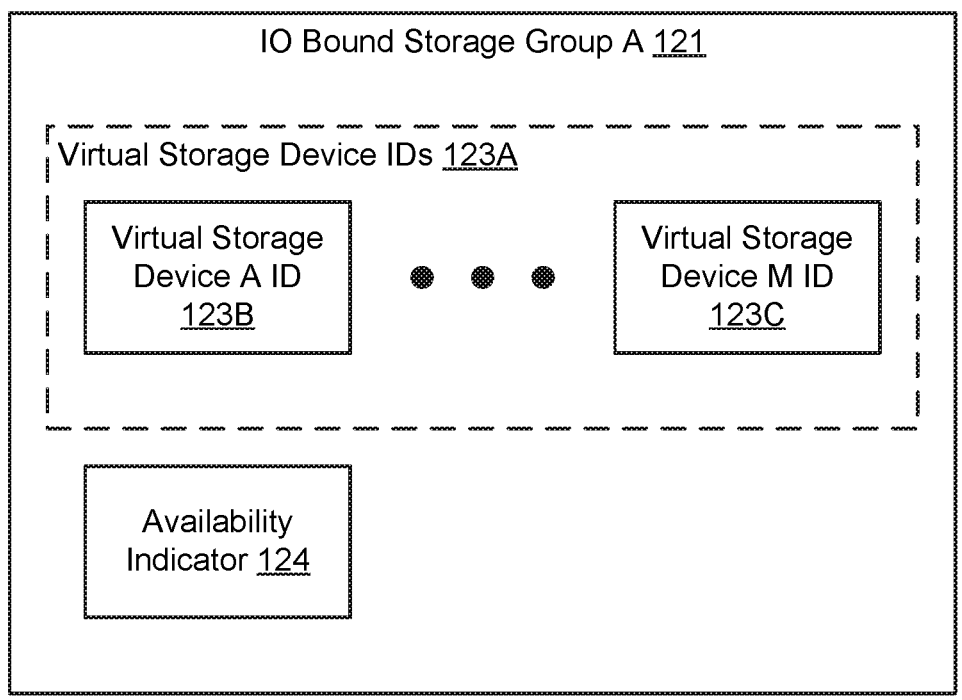
FIG. 1C shows a diagram of an IO bound storage group A in accordance with one or more embodiments of the invention.

For additional details regarding the IO bound storage groups (120), See FIGS. 1B and 1C.

The data storage device (100) may include IO bound storage group utilization heuristics (130). The IO bound storage group utilization heuristics (130) may be a data structure that specifies utilization of the IO bound storage groups (120). In other words, the IO bound storage group utilization heuristics (130) may specify the relative utilization rate of each group specified by the IO bound storage groups (120).

For example, as data is stored in the data storage device the frequency of storing blocks to each group of the IO bound storage groups (120) may be recorded over time. Groups that are utilized at a lower rate than other groups due to, for example, data storage request patterns from clients, may be identified. The IO bound storage group utilization heuristics (130) may be used as part of the method illustrated in FIG. 5.

In one or more embodiments of the invention, the IO bound storage group utilization heuristics (130) are stored in the data storage device (100). The IO bound storage group utilization heuristics (130) may be stored in a persistent storage of the data storage device (100). The IO bound storage group utilization heuristics (130) may be stored in a memory of the data storage device (100).

While illustrated as being stored in the data storage device (100) in FIG. 1, the IO bound storage group utilization heuristics (130) may be stored on another computing device operably connected to the data storage device (100) without departing from the invention. The IO bound storage group utilization heuristics (130) may be stored in a persistent storage of the other computing device. The IO bound storage group utilization heuristics (130) may be stored in a memory of the other computing device. The data storage device (100) may access the other computing device to access the IO bound storage group utilization heuristics (130).

The data storage device (100) may include virtual storage devices (140). The virtual storage devices (140) may be logical data storages that utilize the local physical storage devices (160) and/or the remote storage devices (180). More specifically, the virtual storage devices (140) may abstract one or more, or a portion thereof, of the local physical storage devices (160) and/or the remote storage devices (180) and present a logical data storage that utilizes the aforementioned local and/or remove storage devices. For additional details regarding the relationships between the virtual storage devices (140), local physical storage devices (160) and the remote storage devices (180), See FIGS. 1D-1F.

Each of the virtual storage devices (140) may be capable of storing data. More specifically, each of the virtual storage devices (140) may be capable of storing blocks of data. As will be discussed with respect to FIGS. 2-5, the file block allocator (110) may allocate blocks for storage.

The data storage device (100) may include local physical storage devices (160). The local physical storage devices (160) may be physical devices for storing data. The physical devices may be, for example, hard disk drives, solid state drives, tape drives, zip drives, or any other type of persistent storage device. Each of the physical devices may include circuitry for receiving data storage requests. The data storage requests may be provided to the physical devices by a processor of the data storage device.

The data storage device (100) may include remote storage devices (180). The remote storage devices (180) may be physical storage devices or logical storages for storing data. The remote storage devices (180) may be operably connected to the data storage device (100). The data storage device (100) may store data in the remote storage devices (180) or read data stored in the remote storage devices (180) via the operable connection.

FIGS. 1B and 1C shows data structures in accordance with one or more embodiments of the invention. More specifically, FIG. 1B shows IO bound storage groups (120) and FIG. 1C shows an IO bound storage group A (121) of the IO bound storage groups (120). The aforementioned data structures may be used by the data storage device (100) to distribute data storage across storage devices to load balance data storage.

Returning to FIG. 1B, the drawing shows a diagram of IO bound storage groups (120) in accordance with one or more embodiments of the invention. The IO bound storage groups (120) may be a data structure including a number of IO bound storage groups (121, 122). Each of the IO bound storage groups (121, 122) may specify a number of virtual storage devices that each has a data storage rate that depends on the other virtual storage devices of the group. More specifically, each has a data storage rate that depends on whether other virtual storage devices of the group are storing data at the same time as the respective virtual storage device.

In one or more embodiments of the invention, Each IO bound storage group is specified by a user of the data storage device. For example, whenever a new virtual storage device is added to the data storage system, the user may add the new virtual storage device to an existing IO bound storage group or may create a new IO bound storage group.

In one or more embodiments of the invention, Each IO bound storage group generated by performing a speed test of each virtual storage device. For example, whenever a new virtual storage device is added to the data storage device, the data storage device may measure the data storage rate of the new virtual storage device while not storing data to any other virtual storage device. The data storage device may then sequentially measure the data storage rate of the new virtual storage device while storing data to the new virtual storage device and each existing virtual storage device, respectively. If the measured data storage rate of the new virtual storage device changes between the measurements, the data storage device may add the new virtual storage device to an IO bound storage group that includes the existing virtual storage device to which data was being stored concurrently with the new virtual storage device.

Figure 6:
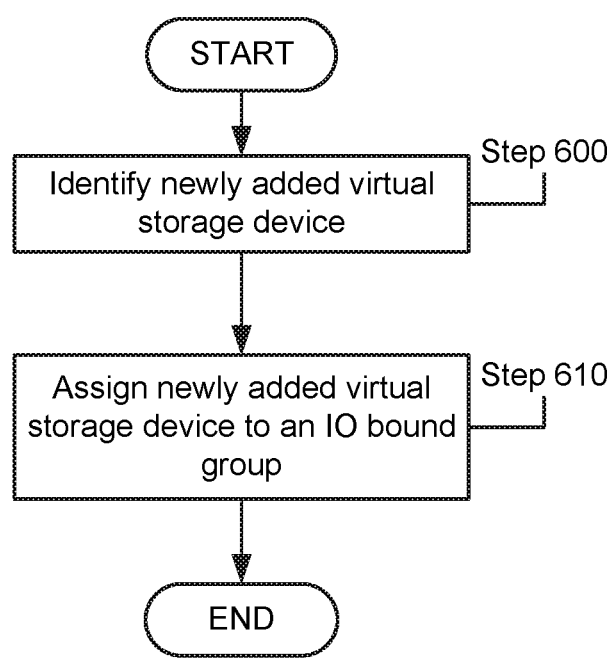
FIG. 6 shows a flowchart of a method of generating IO bound storage groups in accordance with one or more embodiments of the invention.

In one or more embodiments of the invention, Each IO bound storage group is generated by the method shown in FIG. 6. Each IO bound storage group may be generated by other methods without departing from the invention.

FIG. 1C shows an IO bound storage group A (121) in accordance with one or more embodiments of the invention. The IO Bound Storage Group A (121) may be a data structure that specifies virtual storage device IDs (123A) and includes an availability indicator (124). Each virtual storage device ID (123B, 123B) may be an identifier of a virtual storage device of the data storage device. The availability indicator (124) may be a flag that indicates whether data has been distributed to the IO bound storage group A (121) for storage in a virtual storage device specified by the IO bound storage group A (121). The IO bound storage group A (121) may include addition information or other information without departing from the invention.

Figure 1D:
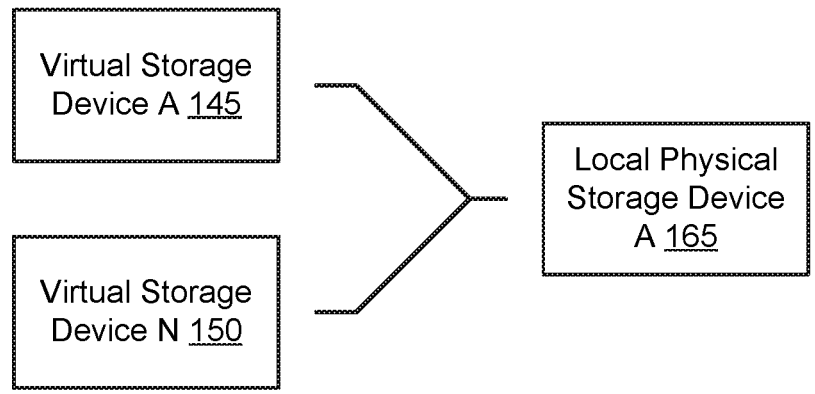
FIG. 1D shows a diagram of a first example relationship in accordance with one or more embodiments of the invention.
Figure 1E:
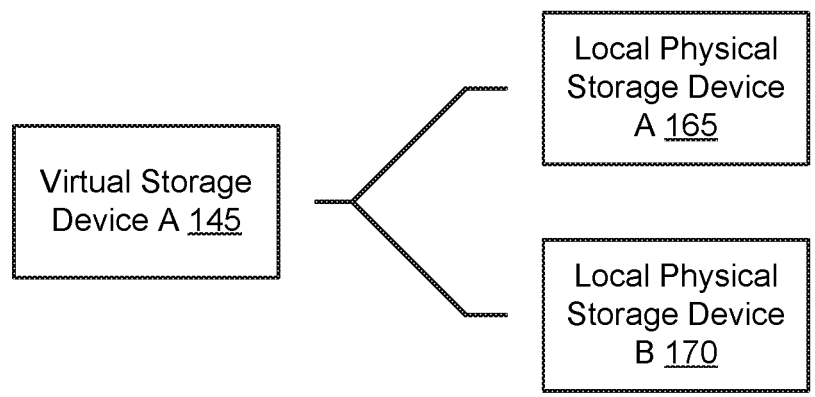
FIG. 1E shows a diagram of a first example relationship in accordance with one or more embodiments of the invention.
Figure 1F:
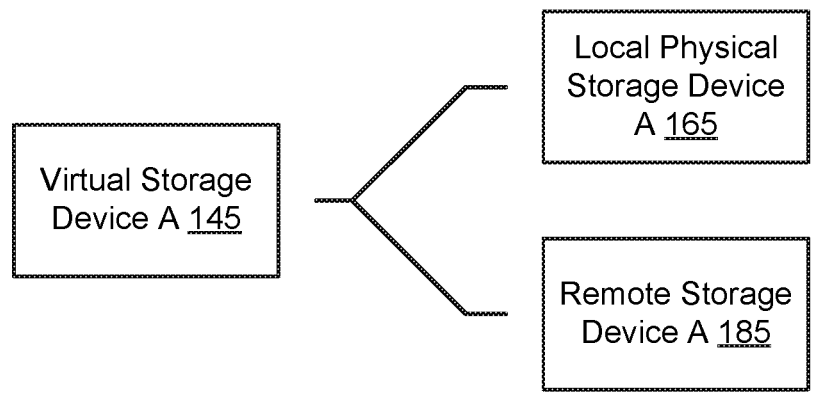
FIG. 1F shows a diagram of a first example relationship in accordance with one or more embodiments of the invention.

FIGS. 1D-1F show diagrams of examples of relationships between virtual storage devices, local physical storage devices, and remote storage devices. More specifically, each of the figures illustrate resource utilization of local physical storage devices and/or remote storage devices by the virtual storage devices.

FIG. 1D shows a first example relationship between virtual storage device A (145), virtual storage device N (150), and local physical storage device A (165). In the first example relationship, virtual storage device A (145) utilizes a first portion of the storage of local physical storage device A (165). Virtual storage device N (170) utilizes a second portion of the storage of local physical storage device A (165). Thus, both virtual storage devices (145, 150) utilize different portions of the local physical storage device A (165).

In the first example relationship, the data storage rate of each virtual storage device (145, 150) depends on the other virtual storage device, i.e., whether the other virtual storage device is storing data at the same time. Thus, with respect to FIG. 1B, both virtual storage devices (145, 150) would be grouped together in an IO bound storage group.

FIG. 1E shows a second example relationship between virtual storage device A (145), local physical storage device A (165), and local physical storage device B (170). In the second example relationship, virtual storage device A (145) utilizes both of the local physical storage device A (165) and local physical storage device B (170). Neither of the local storages are utilized by, e.g., shared with, another virtual storage device.

In the second example relationship, the data storage rate of the virtual storage device A (145) does not depend on any other virtual storage device, i.e., the local storages are not shared with other virtual storage devices. Thus, with respect to FIG. 1B, virtual storage device A (145) would be grouped in its own IO bound storage group without any other virtual storage devices.

FIG. 1F shows a third example relationship between virtual storage device A (145), local physical storage device A (165), and remote storage device A (185). In the second example relationship, virtual storage device A (145) utilizes both of the local physical storage device A (165) and the remote storage device A (185). Neither of the storages are utilized by, e.g., shared with, another virtual storage device.

In the third example relationship, the data storage rate of the virtual storage device A (145) does not depend on any other virtual storage device, i.e., the local/remote storages are not shared with other virtual storage devices. Thus, with respect to FIG. 1B, virtual storage device A (145) would be grouped in its own IO bound storage group without any other virtual storage devices.

FIGS. 2-6 show flowcharts of methods that may be performed by the data storage device of FIG. 1. The illustrated methods may enable the data storage device to load balance data storage.

Figure 2:
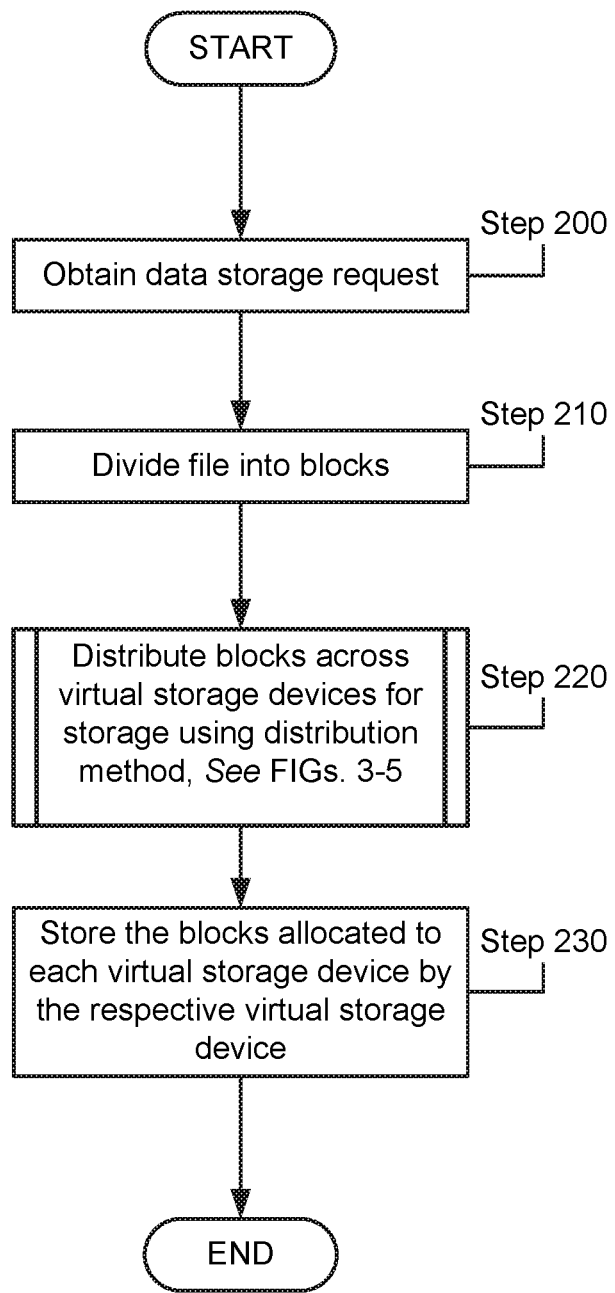
FIG. 2 shows a flowchart of a method of storing data in accordance with one or more embodiments of the invention.

FIG. 2 shows a flowchart in accordance with one or more embodiments of the invention. The method depicted in FIG. 2 may be used to store data in accordance with one or more embodiments of the invention. The method shown in FIG. 2 may be performed by, for example, a data storage device (100, FIG. 1).

In Step 200, a data storage request is obtained. The request may be obtained by receiving the request from a client via a network connection. The request may specify a file for storage.

In Step 210, the file is divided into a number of blocks. The blocks may be chunks, i.e., bit sequences corresponding to a portion of the file, of the file.

In one or more embodiments of the invention, the file is divided into a number of blocks corresponding to the number of IO bound storage groups of the data storage device. In one or more embodiments of the invention, the file is divided into a number of blocks greater than the number of IO bound storage groups of the data storage device. The file may be divided into different numbers of blocks without departing from the invention.

In Step 220, the blocks are distributed across the virtual storage devices for storage using a distribution method. The distribution may be any of the methods illustrated in FIGS. 3-5.

In Step 230, the blocks distributed to each virtual storage device are stored by the respective virtual storage device.

In one or more embodiments of the invention, the blocks may be stored as each block is distributed to the respective virtual storage device in Step 220.

In one or more embodiments of the invention, the blocks are stored after all of the blocks are distributed.

Figure 3:
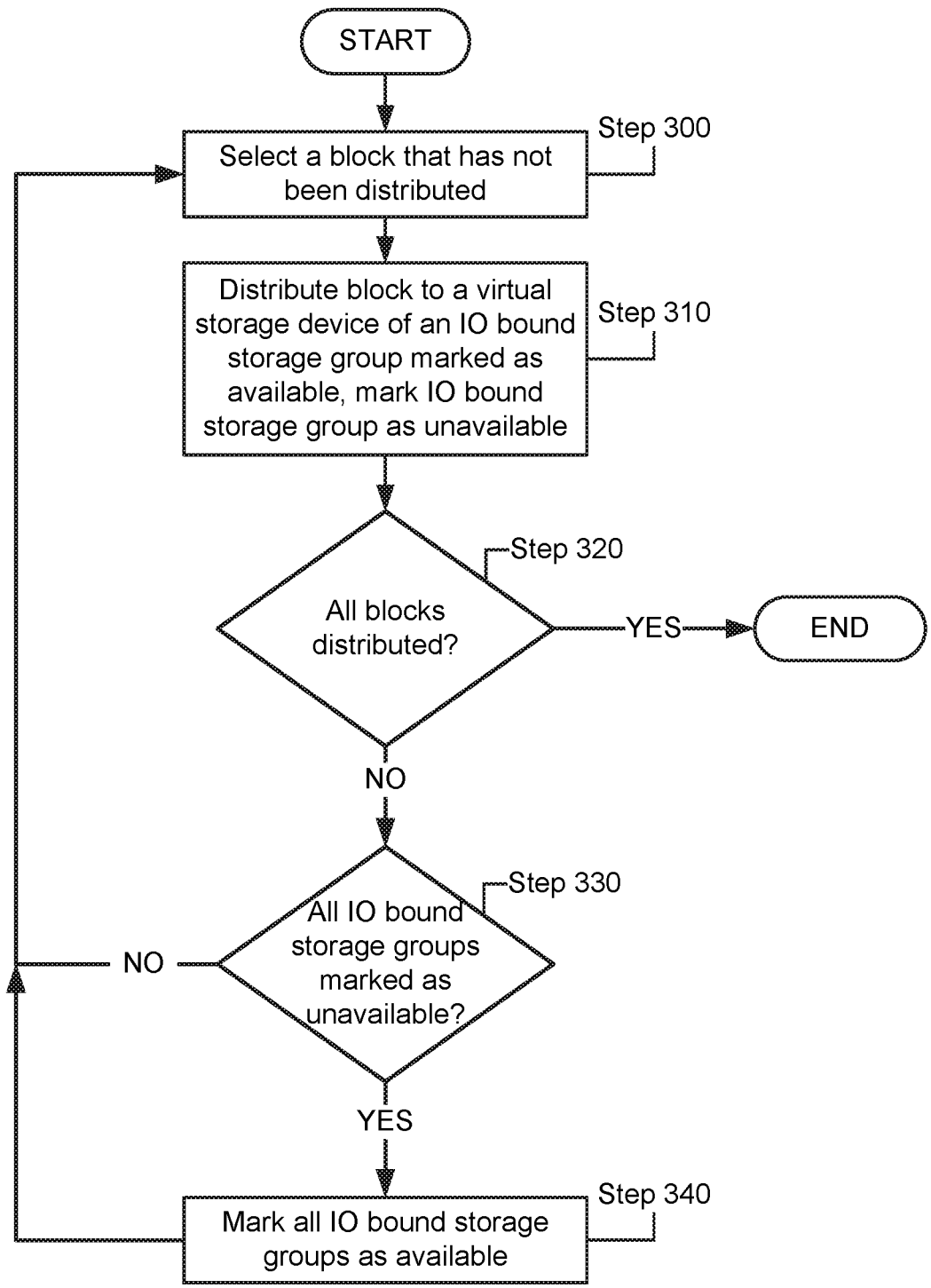
FIG. 3 shows a flowchart of a first method of distributing blocks of a file in accordance with one or more embodiments of the invention.
Figure 4:
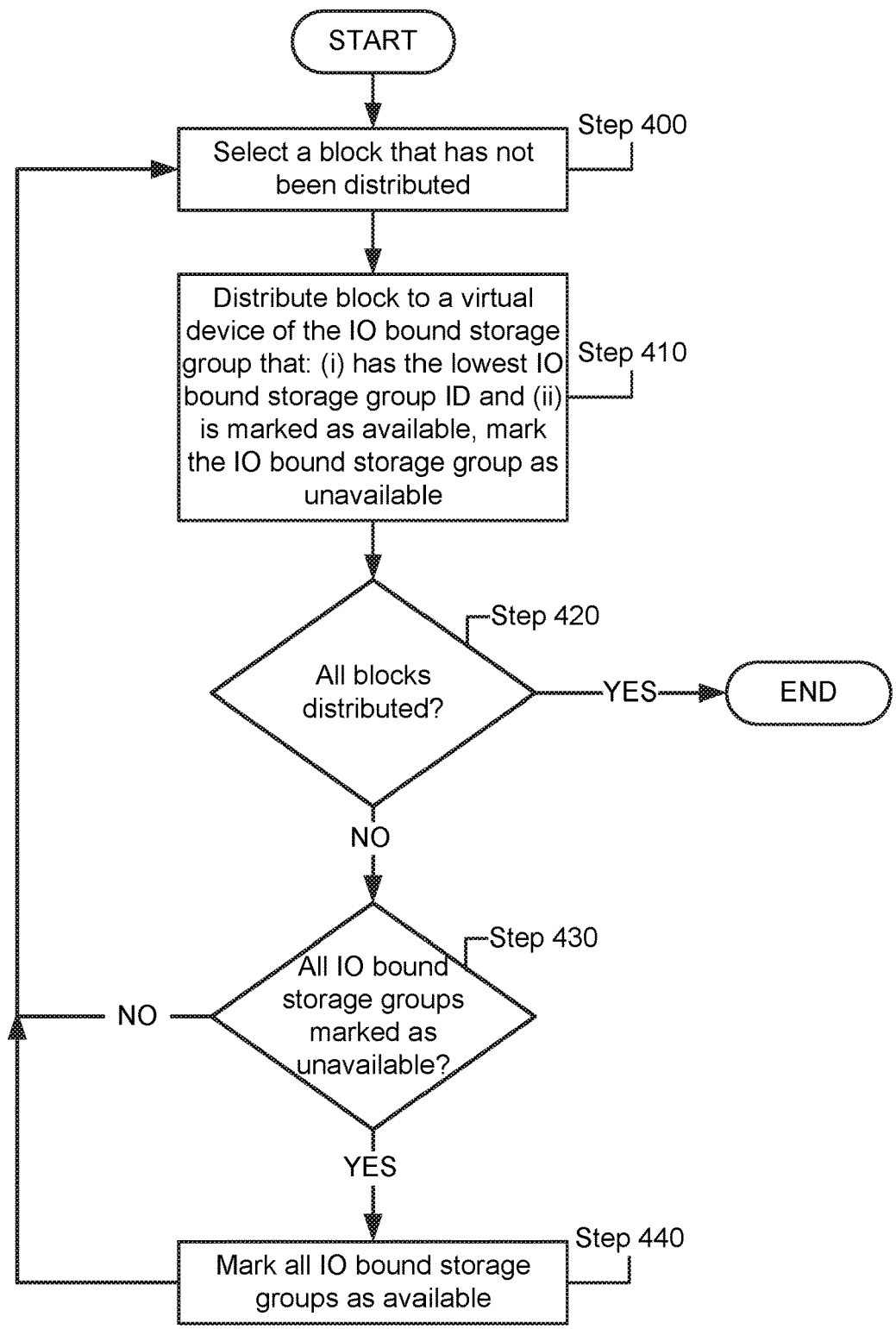
FIG. 4 shows a flowchart of a second method of distributing blocks of a file in accordance with one or more embodiments of the invention.
Figure 5:
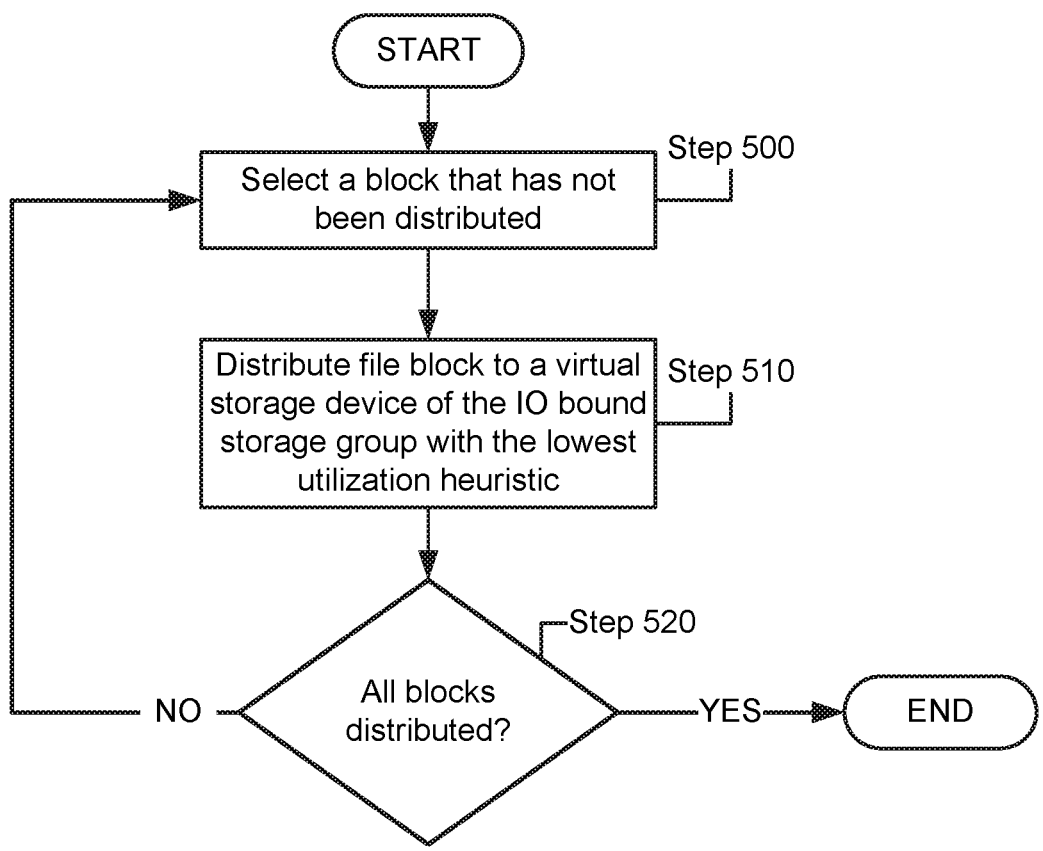
FIG. 5 shows a flowchart of a third method of distributing blocks of a file in accordance with one or more embodiments of the invention.

FIGS. 3-5 illustrate methods of distributing blocks of files for storage. The methods may be used in conjunction with the method shown in FIG. 2 to store a file in the data storage device.

FIG. 3 shows a flowchart of a first method in accordance with one or more embodiments of the invention. The first method depicted in FIG. 3 may be used to distribute blocks in accordance with one or more embodiments of the invention. The method shown in FIG. 3 may be performed by, for example, a data storage device (100, FIG. 1).

In Step 300, a block of a file that has not been distributed is selected. The selection of the block may be arbitrary, e.g., randomly selected, or deterministic, e.g., based on a block identifier of a previously stored block.

In Step 310, the selected block is distributed to a virtual storage device of an IO bound storage group that is marked as available. As used herein, distributing a block to a virtual storage device means to mark, queue, or otherwise cause the block to be stored in the virtual storage device immediately or at a future point in time.

In one or more embodiments of the invention, the IO bound storage group to which the selected block is distributed is marked as unavailable after the selected block is distributed.

In Step 320, it is determined whether all of the blocks of a file are distributed. If all of the blocks are distributed, the method may end following Step 320. If all of the block are not distributed, the method may proceed to Step 330.

In Step 330, it is determined whether all of the IO bound storage groups are marked as unavailable. If all of the IO bound storage groups are marked as unavailable, the method may proceed to Step 340. If all of the IO bound storage groups are not marked as distributed, the method may proceed to Step 300.

In Step 340, all of the IO bound storage groups are marked as available. Each IO bound storage group may be marked as available by modifying an availability indicator of each group to indicate that the group is available. The method may proceed to Step 300 following Step 340.

FIG. 4 shows a flowchart of a second method in accordance with one or more embodiments of the invention. The second method depicted in FIG. 4 may be used to distribute blocks in accordance with one or more embodiments of the invention. The method shown in FIG. 4 may be performed by, for example, a data storage device (100, FIG. 1).

In Step 400, a block of a file that has not been distributed is selected. The selection of the block may be arbitrary, e.g., randomly selected, or deterministic, e.g., based on a block identifier of a previously stored block.

In Step 410, the selected block is distributed to a virtual storage device of an IO bound storage group that: (i) has the lowest IO bound storage group ID and (ii) is marked as available.

In one or more embodiments of the invention, the IO bound storage group to which the selected block is distributed is marked as unavailable after the selected block is distributed.

In Step 420, it is determined whether all of the blocks of a file are distributed. If all of the blocks are distributed, the method may end following Step 420. If all of the block are not distributed, the method may proceed to Step 430.

In Step 430, it is determined whether all of the IO bound storage groups are marked as unavailable. If all of the IO bound storage groups are marked as unavailable, the method may proceed to Step 440. If all of the IO bound storage groups are not marked as distributed, the method may proceed to Step 400.

In Step 440, all of the IO bound storage groups are marked as available. Each IO bound storage group may be marked as available by modifying an availability indicator of each group to indicate that the group is available. The method may proceed to Step 400 following Step 440.

FIG. 5 shows a flowchart of a third method in accordance with one or more embodiments of the invention. The third method depicted in FIG. 5 may be used to distribute blocks in accordance with one or more embodiments of the invention. The method shown in FIG. 5 may be performed by, for example, a data storage device (100, FIG. 1).

In Step 500, a block of a file that has not been distributed is selected. The selection of the block may be arbitrary, e.g., randomly selected, or deterministic, e.g., based on a block identifier of a previously stored block.

In Step 510, the selected block is distributed to a virtual storage device of an IO bound storage group that has the lowest utilization heuristic. As described with respect to FIG. 1, the data storage device may record utilization heuristic data of each IO bound storage group. The IO bound storage group having the lowest utilization heuristic may be selected and thereby cause the block to be distributed to low utilization virtual storage devices.

In one or more embodiments of the invention, the IO bound storage group to which the selected block is distributed is marked as unavailable after the selected block is distributed.

In Step 520, it is determined whether all of the blocks of a file are distributed. If all of the blocks are distributed, the method may end following Step 420. If all of the block are not distributed, the method may proceed to Step 500.

FIG. 6 shows a flowchart of a method in accordance with one or more embodiments of the invention. The method depicted in FIG. 6 may be used to generate IO bound storage groups. The method shown in FIG. 6 may be performed by, for example, a data storage device (100, FIG. 1).

In Step 600, a newly added virtual storage device is identified.

In Step 610, the newly added virtual storage device may be added to an IO bound storage group.

In one or more embodiments of the invention, the newly added virtual storage device may be added: (i) to an existing IO bound storage group or (ii) to a new IO bound storage group. The newly added virtual storage device may be added (i) to an existing IO bound storage group if its data storage rate is dependent on an existing virtual storage device of an IO bound storage group. The newly added virtual storage device may be added (ii) to a new IO bound storage group if its data storage rate is independent of any existing virtual storage device.

In one or more embodiments of the invention, determination (i) or (ii) is made by a user. In other words, a user of the data storage device may elect to add the newly added virtual storage device to a new or existing IO bound storage group based on their knowledge of the virtual storage device, e.g., the physical storage devices that it utilizes.

In one or more embodiments of the invention, determination (i) or (ii) is made by the data storage device. The data storage device may make the determination by comparing (a) the data storage rate of the virtual storage device when the newly added virtual storage device is the only virtual storage device storing data to (b) the data storage rate of the virtual storage device when the newly added virtual storage device and at least one other virtual storage device is storing data. If the data storage rates of (a) and (b) are different, the data storage device may (i) add the newly added virtual storage device to an existing IO bound storage group. If the data storage rates of (a) and (b) are the same, the data storage device may (ii) at the newly added virtual storage device to a new Io bound storage group.

The method may end following Step 610.

The following are explanatory examples used to clarify aspects of the invention.

Example 1

Figure 7A:
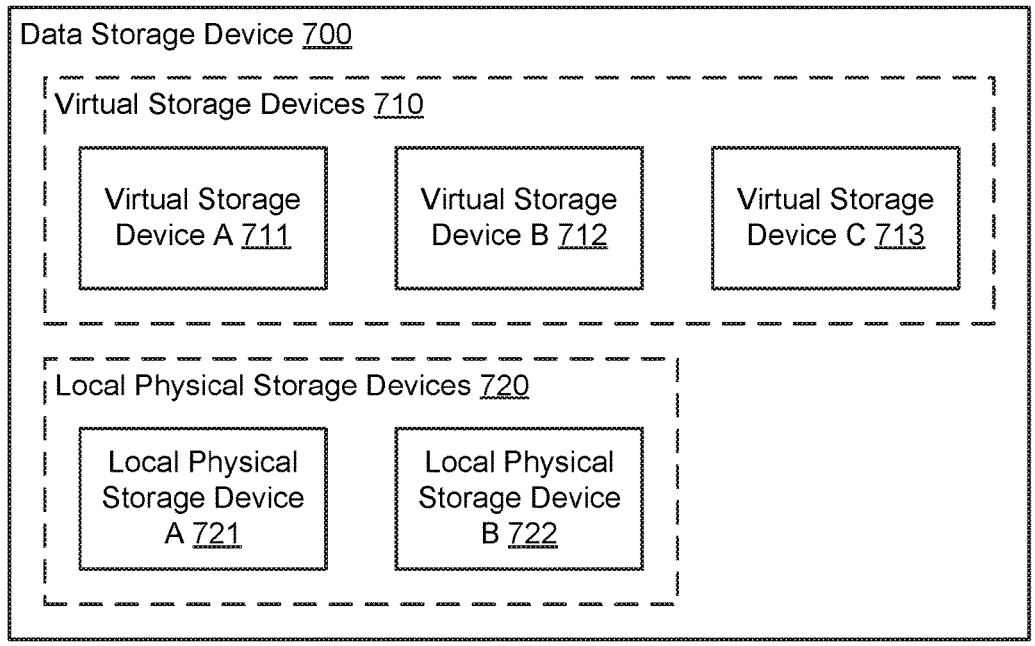
FIG. 7A shows a diagram of a first example system.

FIG. 7A shows a first example of a data storage device (700). The data storage device includes components similar to that of FIG. 1. However, for the sake of brevity, only the virtual storage devices (710) and local physical storage devices (720) are shown.

The data storage device (700) includes three virtual storage devices (711, 712, 713) and two local physical storage devices (721, 722). Each of the virtual storage devices (711, 712, 713) utilize the local physical storage devices (721, 722).

Figure 7B:
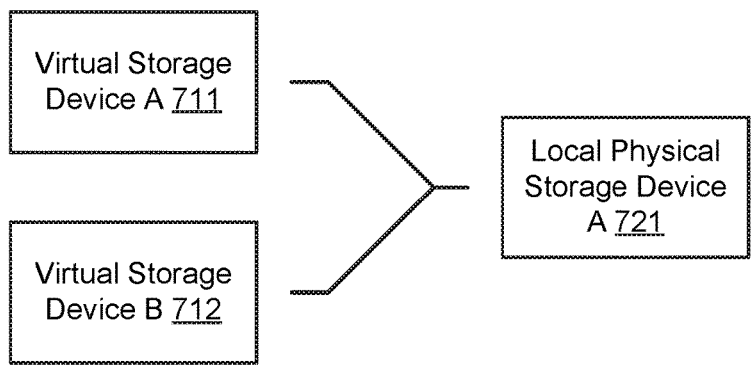
FIG. 7B shows a diagram of a first relationship of the first example system.
Figure 7C:
FIG. 7C shows a diagram of a second relationship of the first example system.

FIGS. 7B and 7C illustrate relationships between the three virtual storage devices (711, 712, 713) and two local physical storage devices (721, 722).

As seen from FIG. 7B, virtual storage device A (711) and virtual storage device B (712) both utilize portions of local physical storage device A (721). Thus, virtual storage device A (711) and virtual storage device B (712) are grouped into an IO bound storage group because their data storage rate varies based on the data storage operations of each virtual storage device.

In contrast, virtual storage device C (713) utilizes local physical storage device B (722) which is not shared with any other virtual storage device. Thus, virtual storage device C (713) is grouped into a different IO bound storage group because its data storage rate does not vary based on the data storage operations of any other virtual storage device.

FIG. 7D shows a diagram of an example of storing blocks of a file by the system of FIG. 7. As seen from the first row ("Block ID") of FIG. 7D, the file is divided into 8 blocks with corresponding block IDs of 1-8.

Each block is distributed for storage to virtual storage devices of IO bound groups using the method illustrated in FIG. 3. As seen from the second row ("Local Physical Storage Device ID") of FIG. 7D, the first block is distributed to local physical storage device A (721). The second block is distributed to local physical storage device B (722). The third block is distributed to local physical storage device A (721). Etc.

Example 2

Figure 8A:
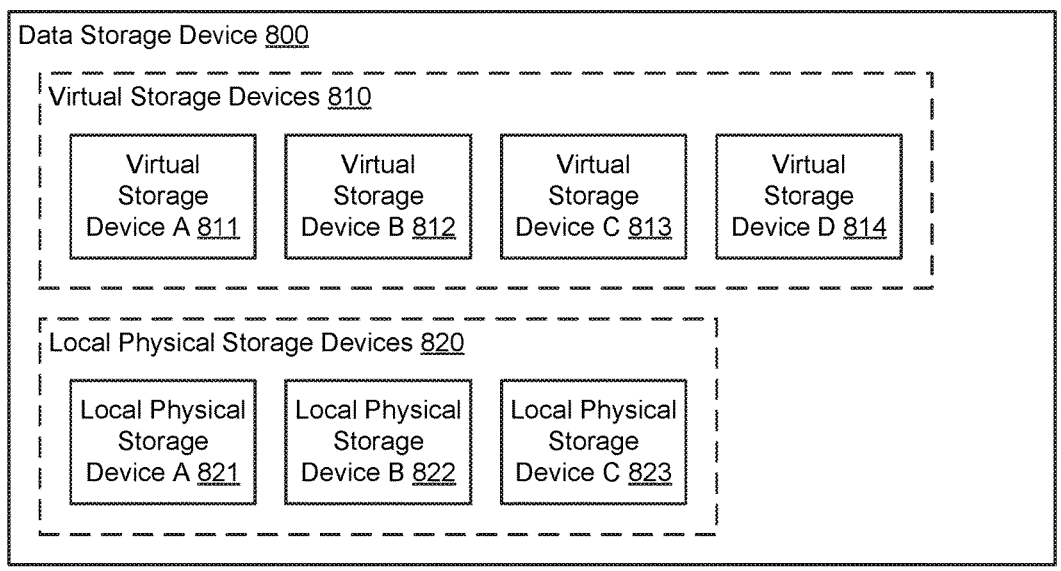
FIG. 8A shows a diagram of a second example system.

FIG. 8A shows a second example of a data storage device (800). The data storage device (800) includes components similar to that of FIG. 1. However, for the sake of brevity, only the virtual storage devices (810) and local physical storage devices (820) are shown.

The data storage device (800) includes four virtual storage devices (811, 812, 813, 814) and three local physical storage devices (821, 822, 823). Each of the virtual storage devices (811, 812, 813, 814) utilize the local physical storage devices (821, 822, 823).

Figure 8B:
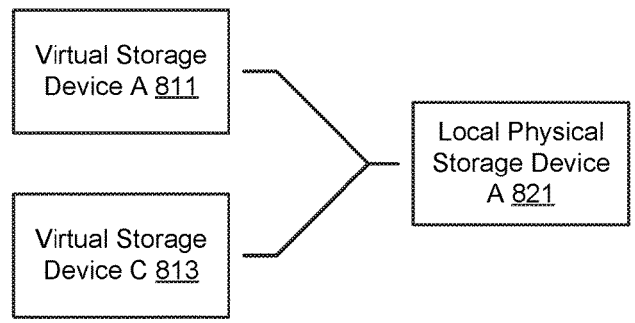
FIG. 8B shows a diagram of a first relationship of the second example system.
Figure 8C:
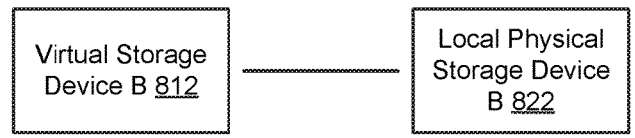
FIG. 8C shows a diagram of a second relationship of the second example system.
Figures 8D, 8E:
FIG. 8D shows a diagram of a third relationship of the second example system.
FIG. 8E shows a diagram of an example of storing data in the second example system.

FIGS. 8B-8D illustrate relationships between the four virtual storage devices (811, 812, 813, 814) and three local physical storage devices (821, 822, 823).

As seen from FIG. 8B, virtual storage device A (811) and virtual storage device C (813) both utilize portions of local physical storage device A (821). Thus, virtual storage device A (811) and virtual storage device C (813) are grouped into an IO bound storage group because their data storage rate varies based on the data storage operations of each virtual storage device in the IO bound storage group.

In contrast, virtual storage device B (812) utilizes local physical storage device B (822) which is not shared with any other virtual storage device. Thus, virtual storage device B (812) is grouped into a different IO bound storage group because its data storage rate does not vary based on the data storage operations of any other virtual storage device.

Similarly, virtual storage device D (814) utilizes local physical storage device C (823) which is not shared with any other virtual storage device. Thus, virtual storage device C (813) is grouped into a third IO bound storage group because its data storage rate does not vary based on the data storage operations of any other virtual storage device.

FIG. 8E shows a diagram of an example of storing blocks of a file by the system of FIG. 8. As seen from the first row ("Block ID") of FIG. 8E, the file is divided into 8 blocks with corresponding block IDs of 1-8.

Each block is distributed for storage to virtual storage devices of IO bound groups using the method illustrated in FIG. 3. As seen from the second row ("Local Physical Storage Device ID") of FIG. 8E, the first block is distributed to local physical storage device A (821). The second block is distributed to local physical storage device B (822). The third block is distributed to local physical storage device C (823). The fourth block is distributed to local physical storage device A (821). Etc.

One or more embodiments of the invention may be implemented using instructions executed by one or more processors in the data storage device. Further, such instructions may correspond to computer readable instructions that are stored on one or more non-transitory computer readable mediums.

One or more embodiments of the invention may enable one or more of the following: i) distribute data storage across data storage resources of a data storage device, ii) prevent data from being queued for storage in two virtual storage devices that are data storage rate limited with each other, and iii) improve the data storage rate of a data storage device by only distributing blocks of files to virtual storage devices for storage that are not rate limited by any other virtual storage devices receiving blocks for storage.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data storage device, comprising:
a plurality of virtual storage devices hosted by a plurality of physical storage devices; and
a processor programmed to:
obtain a data storage request;
divide a file specified by the data storage request into a plurality of blocks;
divide the plurality of virtual storage devices into a plurality of IO bound storage groups; and
store the plurality of blocks in the plurality of virtual storage devices based on an input output (IO) limitation of the plurality of virtual storage devices, wherein storing the plurality of blocks comprises:
distributing the blocks to the plurality of virtual storage devices based on the plurality of IO bound storage groups; and
storing the distributed blocks in the plurality of virtual storage devices based on the distribution.

2. The data storage device of claim 1, wherein the IO limitation is caused by a first virtual storage device of the plurality of virtual storage devices and a second virtual storage device of the plurality of virtual storage devices sharing a physical storage device of the plurality of physical storage devices.

3. The data storage device of claim 2, wherein a first portion of the physical storage device of the plurality of physical storage devices is allocated to the first virtual storage device and a second portion of the physical storage device of the plurality of physical storage devices is allocated to the second virtual storage device.

4. The data storage device of claim 1,
wherein all of the virtual storage devices specified by each IO bound storage group share a respective physical storage device.

5. The data storage device of claim 1, wherein the blocks are distributed evenly across the IO bound storage groups.

6. The data storage device of claim 1, wherein the blocks are distributed unevenly across the IO bound storage groups.

7. The data storage device of claim 1, wherein the distribution of the blocks to the plurality of virtual storage devices is also based on IO bound storage group utilization heuristics.

8. The data storage device of claim 7, further comprising:
the IO bound storage group utilization heuristics that specify a frequency of which blocks are distributed to each of the IO bound storage groups.

9. A method of operating a data storage device, comprising:
obtaining, by the data storage device, a data storage request;
dividing, by the data storage device, a file specified by the data storage request into a plurality of blocks;
dividing, by the data storage device, the plurality of virtual storage devices into a plurality of IO bound storage groups; and
storing, by the data storage device, the plurality of blocks in a plurality of virtual storage devices of the data storage device based on an input output (IO) limitation of the plurality of virtual storage devices, wherein storing the plurality of blocks comprises:
  distributing the blocks to the plurality of virtual storage devices based on the plurality of IO bound storage groups; and
  storing the distributed blocks in the plurality of virtual storage devices based on the distribution.

10. The method of claim 9, wherein dividing the plurality of virtual storage devices into the plurality of IO bound storage groups comprises:
  identifying a first virtual storage device of the plurality of virtual storage devices and a second virtual storage device of the plurality of virtual storage devices that share a physical storage device, and
  adding the first virtual storage device of the plurality of virtual storage devices and the second virtual storage device of the plurality of virtual storage devices to a first IO bound storage group specified by the IO bound storage groups.

11. The method of claim 10, wherein dividing the plurality of virtual storage devices into the plurality of IO bound storage groups further comprises:
  identifying a third virtual storage device of the plurality of virtual storage devices that does not share any physical storage devices with the first virtual storage device of the plurality of virtual storage devices, and
  adding the third virtual storage device of the plurality of virtual storage devices to a second IO bound storage group specified by the IO bound storage groups.

12. A non-transitory computer readable medium comprising computer readable program code, which when executed by a computer processor enables the computer processor to perform a method for operating a data storage device, the method comprising:
  obtaining, by the data storage device, a data storage request;
  dividing, by the data storage device, a file specified by the data storage request into a plurality of blocks;
  dividing, by the data storage device, the plurality of virtual storage devices into a plurality of IO bound storage groups before storing the plurality of blocks; and
  storing, by the data storage device, the plurality of blocks in a plurality of virtual storage devices of the data storage device based on an input output (IO) limitation of the plurality of virtual storage devices, comprising:
    distributing the blocks to the plurality of virtual storage devices based on the plurality of IO bound storage groups; and
    storing the distributed blocks in the plurality of virtual storage devices based on the distribution.

13. The non-transitory computer readable medium of claim 12, wherein dividing the plurality of virtual storage devices into the plurality of IO bound storage groups comprises:
  identifying a first virtual storage device of the plurality of virtual storage devices and a second virtual storage device of the plurality of virtual storage devices that share a physical storage device, and
  adding the first virtual storage device of the plurality of virtual storage devices and the second virtual storage device of the plurality of virtual storage devices to a first IO bound storage group specified by the IO bound storage groups.

14. The non-transitory computer readable medium of claim 13, wherein dividing the plurality of virtual storage devices into the plurality of IO bound storage groups further comprises:
  identifying a third virtual storage device of the plurality of virtual storage devices that does not share any physical storage devices with the first virtual storage device of the plurality of virtual storage devices, and
  adding the third virtual storage device of the plurality of virtual storage devices to a second IO bound storage group specified by the IO bound storage groups.

* * * * *